United States Patent [19]

Kunkle

[11] 4,197,107

[45] Apr. 8, 1980

[54] CONVEX BOTTOMED FLOAT GLASS FORMING CHAMBER ENTRANCE

[75] Inventor: Gerald E. Kunkle, New Kensington, Pa.

[73] Assignee: PPG Industries, Inc., Pittsburgh, Pa.

[21] Appl. No.: 958,284

[22] Filed: Nov. 6, 1978

[51] Int. Cl.² ............................................. C03B 18/02
[52] U.S. Cl. ................................. 65/99 A; 65/182 R
[58] Field of Search ........................... 65/99 A, 182 R

[56] References Cited

U.S. PATENT DOCUMENTS

| 3,351,452 | 11/1967 | Robinson | 65/99 A X |
| 3,442,636 | 5/1969 | Kita et al. | 65/182 |
| 3,576,612 | 4/1971 | Prislan | 65/182 |
| 3,884,665 | 5/1975 | Edge et al. | 65/99 A |
| 3,973,940 | 8/1976 | Edge et al. | 65/99 A |

*Primary Examiner*—Arthur D. Kellogg
*Attorney, Agent, or Firm*—Paul A. Leipold

[57] ABSTRACT

A method and apparatus for glass delivery to a forming chamber are disclosed. The forming entrance bottom comprises an upward facing convex surface wherein the highest point of the convex surface extends generally in the direction of glass movement.

29 Claims, 10 Drawing Figures

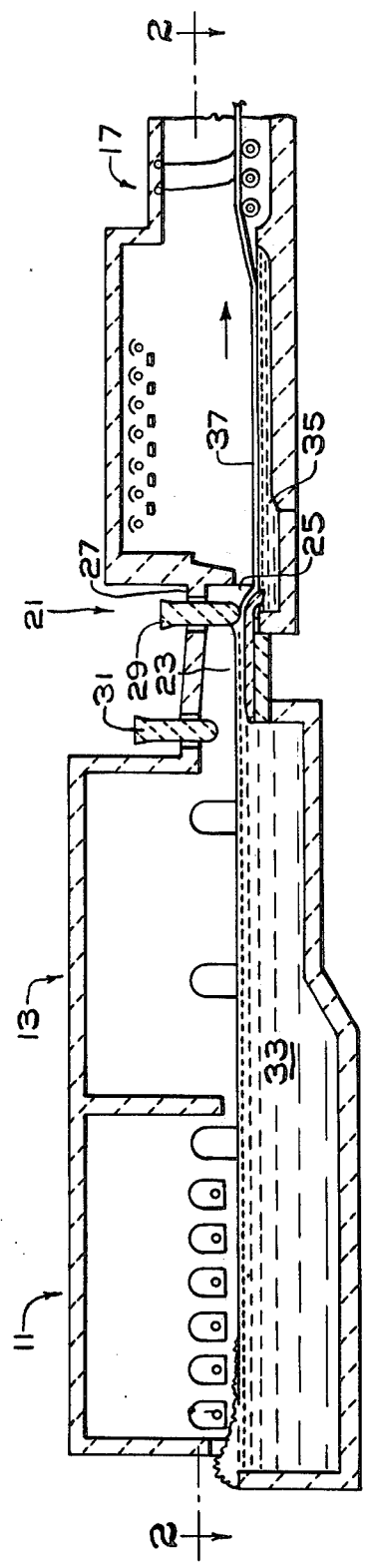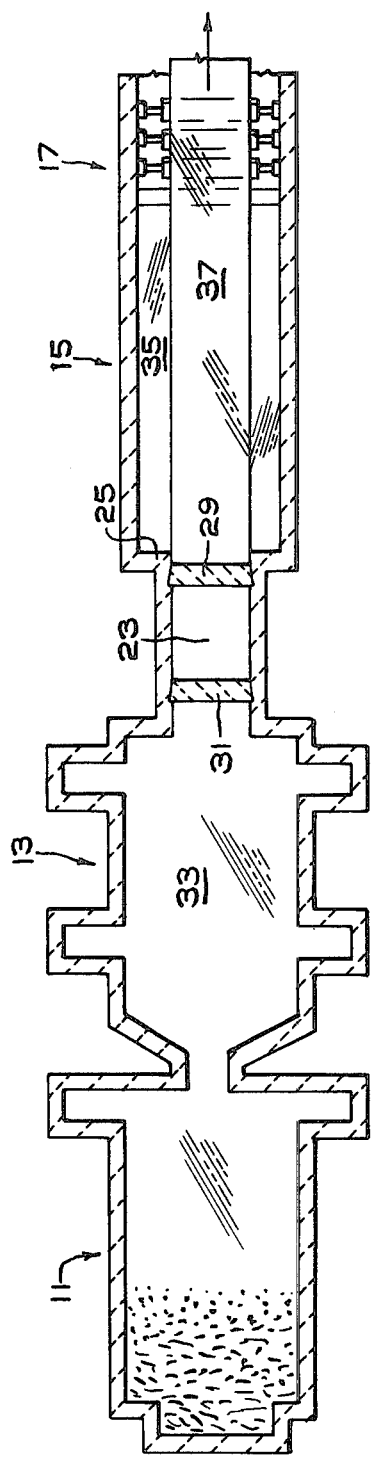

CONVEX BOTTOMED FLOAT GLASS FORMING CHAMBER ENTRANCE

BACKGROUND OF THE INVENTION

1. Field of the Invention

This invention relates to apparatus and method for the manufacture of a continuous sheet of flat glass by supporting molten glass on a pool of molten metal while forming and cooling the glass. More particularly, this invention relates to apparatus and method for the delivering of the molten glass onto a pool of metal for formation.

2. Description of the Prior Art

Molten glass may be delivered onto molten metal and formed into a continuous sheet or ribbon of glass. In the method according to the patents of Pilkington, U.S. Pat. No. 3,083,551 and U.S. Pat. No. 3,220,816, the molten glass is delivered through a narrow channel and over a lip from which the molten glass falls onto the molten metal and spreads outwardly on the molten metal. The method of Pilkington utilizing a free-fall of the glass presents problems in control of the molten glass sheet as it leaves the pool it has formed by falling onto the tin, and further, presents problems in forming glass sheet that is not near the equilibrium thickness of molten glass floating on tin.

In order to overcome some of the disadvantages of the process when the glass is allowed to freely fall, a process was developed wherein a wide molten ribbon of glass was delivered onto the tin bath and then attenuated with very little change in width between the width of channel or canal from the furnace and the width of the ribbon or sheet of glass on the molten tin. Such a process is disclosed in U.S. Pat. No. 3,843,346 to Edge et al. This process allows good delivery control as the glass is smoothly delivered to the forming chamber. However, while delivery to the forming chamber is smooth the glass sheet is likely to have a thickness contour causing areas of visual distortion closely following the temperature and viscosity profile the molten glass has as it is delivered to the forming chamber's bath of molten metal.

In both the free fall delivery channel and the wide forming entrance there is a tendency within the forming entrance for the molten glass to become cooler at the edges by heat loss in those areas and also the flow rate is slowed by frictional drag at the edges. Therefore, there is a tendency for a parabolic temperature and viscosity distribution of high velocity and low viscosity hotter glass at the center of the canal or delivery channel and cooler, slower moving glass at the edges of the delivery channel. This creates thickness contour control difficulty as the higher temperature areas will stretch to greater degree during the attenuation or attenuation and stretching in the forming chamber. The cooler edges also may devitrify and lodge in the forming entrance. The devitrified glass lodged in the forming entrance may break off in pieces which disrupt the forming chamber operation.

In order to try to even the flow of the glass and control the parabolic viscosity temperature distribution of the glass, it has been proposed that the tweel be shaped to restrict flow of the molten glass at the center portion of the delivery channel. Such shaped tweel members are disclosed in U.S. Pat. No. 3,973,940 and U.S. Pat. No. 3,442,636 wherein a tweel having a lower center portion than edges is disclosed. However, such tweels, as they only contact one point of the glass stream entering the forming chamber, create a localized flow pattern around the tweel but do not significantly change the basic temperature and viscosity characteristics of the glass within the entering channel.

Therefore, there remains a need for an improved system of glass delivery to a forming chamber such that the temperature and viscosity distribution would be improved. At present in order to alleviate the parabolic temperature and viscosity distribution in the molten sheet glass, the use of overhead cooling in the forming chamber and in the forming entrance upstream of the tweel to cool the center portions of the glass has been practiced. However, these methods are difficult to control so as to give even cooling and not introduce additional areas of uneven temperature causing distortion at the top and bottom surfaces of the glass sheet. It would be desirable if the forming chamber could be successfully operated without substantial overhead cooling of the glass sheet.

As set forth above there remains a need for a method of glass delivery to the forming chamber that will aid in formation of a glass with an even thickness contour. Present systems deliver a hot center and relatively cold edges that stretch non-uniformly as they do not flow uniformly resulting in an uneven surface contour. There remains a need for an entrance to the forming chamber that will not permit devitrification of glass or accumulation of devitrified glass at the sides of the entrance during normal operation. The above difficulties are further exacerbated by increases in tonnage put through the forming system and furnace conditioners that do not have return flow. Also, conditioners which provide no return flow may deliver glass to the forming entrance that already has some temperature and viscosity profile.

SUMMARY OF THE INVENTION

It is therefore an object of this invention to overcome the disadvantages of prior processes and apparatus.

It is another object of this invention to produce flat glass of low optical distortion.

It is a further object of this invention to deliver molten glass to a forming chamber with favorable temperature and viscosity distribution.

It is another additional object of this invention to produce glass of improved thickness uniformity.

It is a further additional object of this invention to reduce the liklihood of devitrification in the forming entrance.

It is another object of this invention to produce flat glass with reduced need for overhead cooling.

It is an additional object of this invention to produce generally uniform viscosity in glass across its width during stretching in the forming chamber.

These and other objects of the invention are generally accomplished by shaping the bottom of the delivery entrance such that the bottom of the forming entrance comprises an upwardly facing convex surface. The highest point of the convex surface are generally located along the center line of the delivery channel. This shape of the forming entrance results in more even glass flow with more uniform temperature glass delivered to the forming chamber.

In a preferred embodiment of the invention, the forming entrance is between about 10 and 15 feet in length with the upwardly facing convex portion extending substantially the entire length of the forming entrance.

The channel is formed of clear fused quartz and the depth of glass in the forming entrance passing beneath the tweel is about twice the depth at the edges as at the center over the raised convex surface.

In the preferred embodiment the width of the forming entrance is about the width of the glass sheet exiting the forming chamber.

BRIEF DESCRIPTION OF THE DRAWINGS

FIG. 1 is a longitudinal, sectional elevational view of a glass conditioner and a glass forming chamber connected by the forming entrance of the invention.

FIG. 2 is a horizontal sectional view taken along sectional line 2—2 of FIG. 1.

DESCRIPTION OF THE PREFERRED EMBODIMENTS

Figure 3:
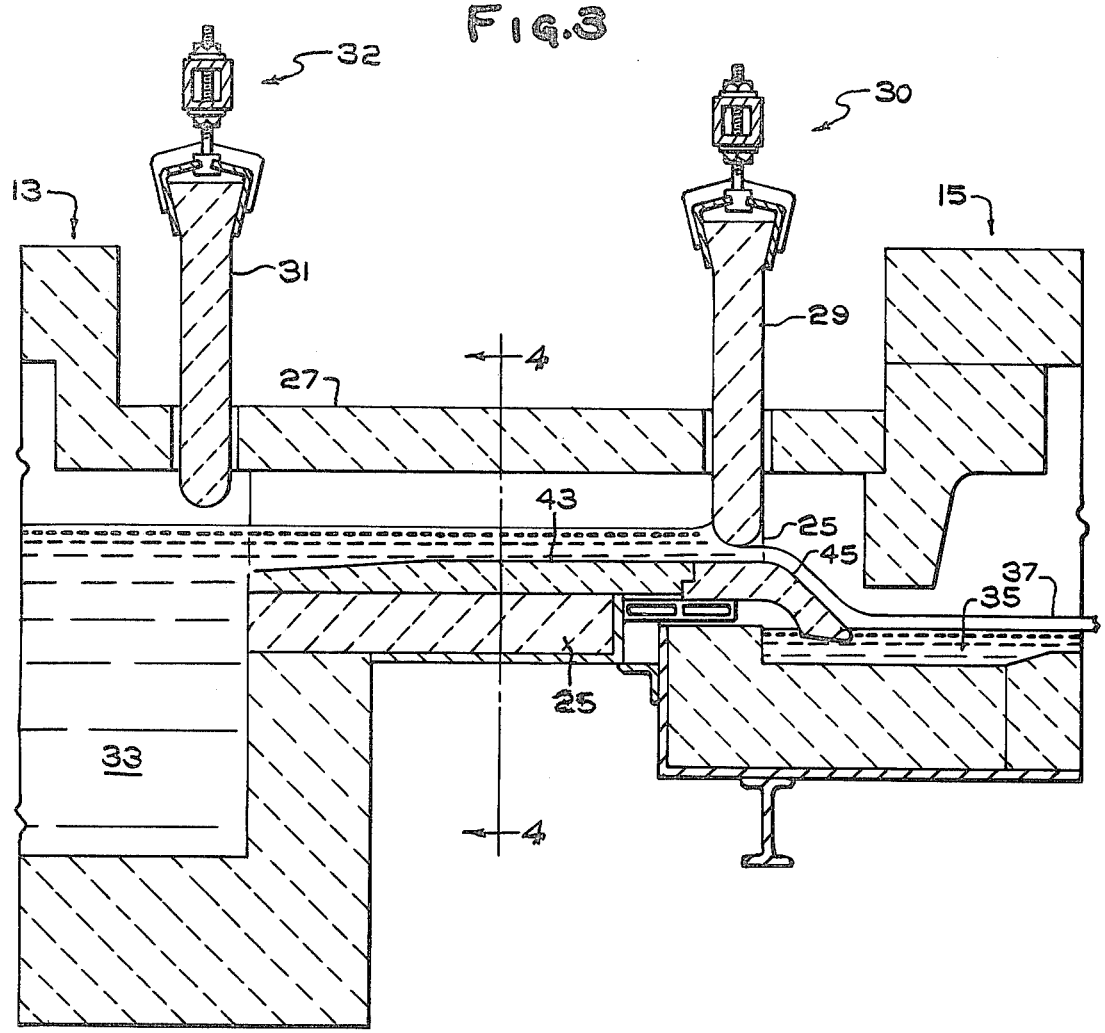
FIG. 3 is an enlarged longitudinal sectional view of the canal of the invention.

Glassmaking materials are melted in a glass melter. From this melter molten glass flows into a glass refiner or conditioner connected to the glass melter. In the conditioner, the molten glass is gradually cooled to a suitable temperature for forming and the molten glass is then delivered from the conditioner onto a pool of molten metal in a glass forming chamber. In the glass forming chamber, the molten glass which has been delivered onto the surface of the molten metal in the form of a wide, relatively shallow stream is cooled to form a continuous, dimensionally stable sheet of glass. It may be stretched or attenuated by the application of longitudinal forces, lateral forces or both to form a sheet of desired thickness. This continuous sheet of glass is then withdrawn from the forming chamber for further processing.

The molten glass is delivered from the conditioner to the glass forming chamber through a delivery means, generally comprising an enclosed forming entrance. The molten glass is withdrawn from the refiner and caused to flow along a substantially horizontal path through an opening defined by a bottom member, side members and a top member. At least one of these opening defining members is movable so that the size of the opening may be varied. Preferably, the top member is movable and is characterized as a metering member or tweel.

The forming entrance through which the molten glass flows onto the molten metal also includes side members or jambs which extend upwardly from the ends of the threshold member. The marginal edges of the stream of molten glass flowing over the bottom member engage the side members. Joining the side members and extending over the bottom is a roof. In general, the metering member or tweel extends downwardly from the roof over the bottom member so as to engage the upper surface of the molten glass flowing over the bottom or threshold member. The tweel is used to control the size of the opening through which molten glass flows. In general, the metering member is aligned with its lowermost portion substantially transverse the highest portion of the upwardly facing convex upper surface of the threshold. The directions "upstream" and "downstream" are defined by the direction of glass flow through the process; that is, glass flows from an upstream portion of the glassmaking apparatus toward a downstream portion of the glassmaking apparatus.

The threshold member may be provided with means for heating or cooling the threshold. For example, cooling pipes may extend through the threshold member, or heating elements may extend through it.

In a preferred embodiment, the continuous sheet of glass being drawn is drawn at a rate such that its width is substantially equal to the spacing between the side members of the delivery means. In this way, the process is much more stable than a free fall process, particularly when the glass being produced has a thickness less than that attained at equilibrium with the molten metal forming bath. This is attributed to the fact that the ribbon or body of glass is anchored along a line rather than only at a point during attenation.

Referring now to FIGS. 1 and 2, there is shown a glassmaking facility including a glassmaking furnace and a glass forming chamber. A glass melter 11, such as a conventional regenerative gas- or oil-fired furnace, is provided for melting raw materials to form molten glass.

Connected to the melter 11 is a refiner or glass conditioner 13. Molten glass is refined in the refiner or conditioner 13 in preparation for forming and is contained therein prior to delivery to a forming chamber.

Connected to the refiner 13 is a forming chamber 15. Connected to the forming chamber 15 is a glass take-out apparatus 17.

The refiner 13 and forming chamber 15 are connected through a glass delivery means 21.

The glass delivery means 21 comprises a bottom or threshold member 23, side members 25, a roof 27, a metering member 29 and a shutoff member 31. The metering member 29 is movable so that the opening defined by it, along with the side members or jambs 25 and the threshold 23, may be varied. Thus, the rate of glass flow through the opening can be controlled.

Molten glass 33 in the refiner 13 is cooled to a temperature such that its viscosity is within the range of from about $10^3$ to about $10^4$ poises. This molten glass is then withdrawn from the refiner and caused to flow through the opening defined by the threshold, the side members and the metering member onto a pool of molten metal 35 in the forming chamber 15. The body of glass formed on the surface of the pool of molten metal 35 is cooled and attentuated to form a dimensionally stable, continuous sheet or ribbon 37 of flat glass which is removed from the pool of molten metal and the forming chamber by the take-out apparatus 17 generally comprising supporting and conveying rolls.

The present apparatus and method are useful in making flat glass of any composition, such as, for example, soda-lime-silica glasses, alumino-silica glasses, borosilicate glasses and the like. In the making of soda-limesilica glasses, it has been found particularly beneficial and preferred to utilize a clear fused quartz refractory of 99.99% silica glass as bottom and side members of the forming entrance in the instant invention. Clear fused quartz is preferred as it will not contaminate the glass as it wears and has a long life. Other known forming entrance refractories, such as quartz, may be employed but without the long life and/or non-contaminating characteristics of the clear fused quartz. A preferred material for the tweel or metering member has been found to comprise fused cast silica. Fused silica is prepared in a manner similar to that described in U.S. Pat. No. 3,151,964 to North, and is crushed and ground to form fused silica powder. The ground fused silica powder is screened and classified. A casting slip is prepared from the fused silica powder fines, and this slip is cast into suitably shaped plaster molds to make a threshold member, side members and a metering member. The resulting green members are slowly dried and then fired in a kiln to produce a threshold, side members and a metering member, each having extremely smooth surfaces for glass contact.

The metering member is a slab shape having a longitudinal cross section, substantially as shown in FIG. 3. This member is similar in shape to a conventional tweel as used in prior processes wherein glass flows over a lip and down onto casting rolls or onto a molten metal forming bath. The metering member preferably has a tapered top portion to secure it in a supporting structure that may be raised and lowered to control the position of the metering member with respect to the threshold.

The side members or jambs are preferably shaped to partially rest on the threshold and partially rest outside the ends of the threshold so that they may be mechanically urged downwardly and inwardly against the threshold. As shown in FIG. 2, the side members are preferaby concave-shaped in plan cross section in order to receive the metering member and prevent it from moving downstream due to the hydrostatic and flow forces of molten glass against it.

The bottom member is preferably provided with access holes extending through it along its transverse length. These holes are for receiving heaters or coolers to control the threshold temperature during use.

The threshold has a convex upwardly facing top surface. As shown in FIG. 3, the top of the preferred threshold is defined by an upstream face 41, a top horizontal face 43 and a downstream face 45. The metering member preferably extends downwardly toward the threshold in the vicinity of the top face-downstream face intersection.

In a preferred threshold embodiment, the top face is about horizontal and the upstream and downstream faces are angled downward therefrom. The upstream face is angled from the horizontal about 20°, and the downstream face is angled from the horizontal about 10°. The downstream face extends a sufficient distance so that molten metal of the pool of molten metal in the forming chamber extends over a portion of the downstream face. As molten glass is delivered over the threshold and onto the molten metal, glass flowing adjacent the metering member or the threshold flows sufficiently slowly that erosion of these members is minimal.

The bottom member of the forming entrance may be formed of any refractory material that allows successful delivery of glass from the glass melter to the forming chamber. Among suitable materials are inert metal, such as platinum, alumina and aluminum refractories. A preferred material is fused silica as it will not contaminate the glass as it deteriorates. The optimum is clear, fused quartz, as this material will not contaminate the glass, has dimensional stability over a wide temperature range and a long life.

Figure 4:
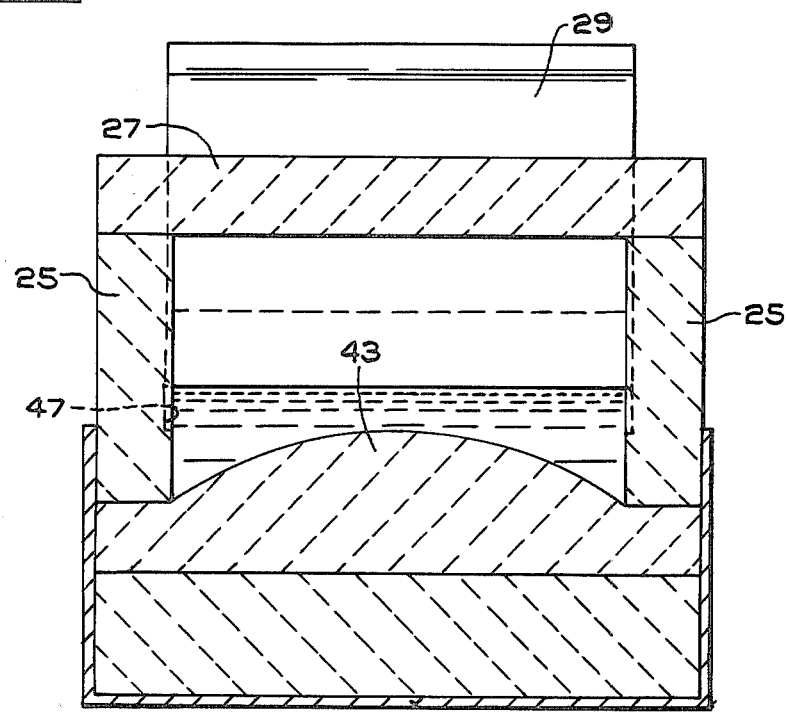
FIG. 4 is a transverse or lateral sectionalization of the apparatus of FIG. 3 taken along the line 4—4 of FIG. 3.
Figure 5:
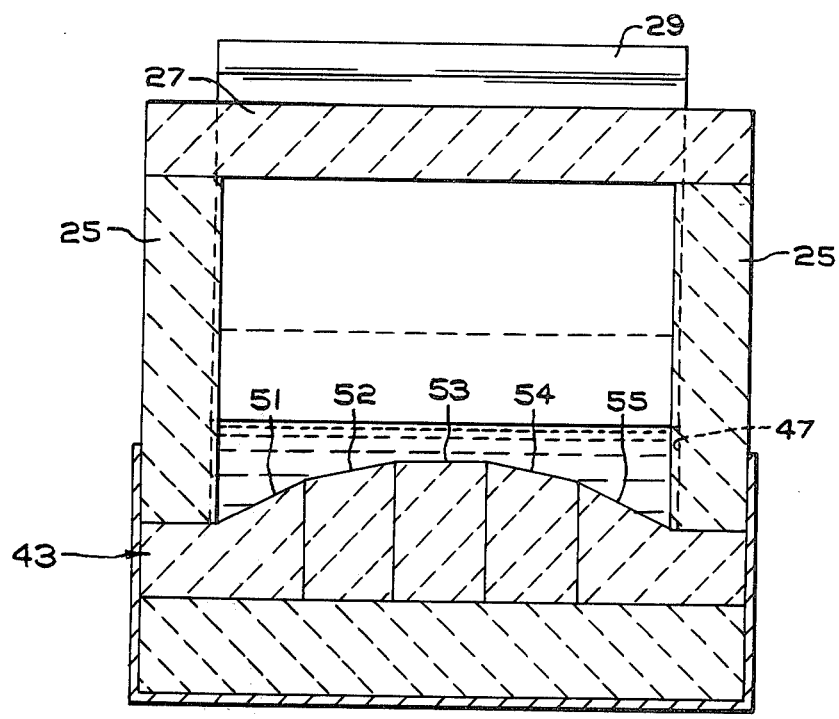
FIGS. 5, 6, 7 and 8 are all transverse sectionalizations of alternate arrangements of the upwardly facing canal of the instant system.
Figure 6:
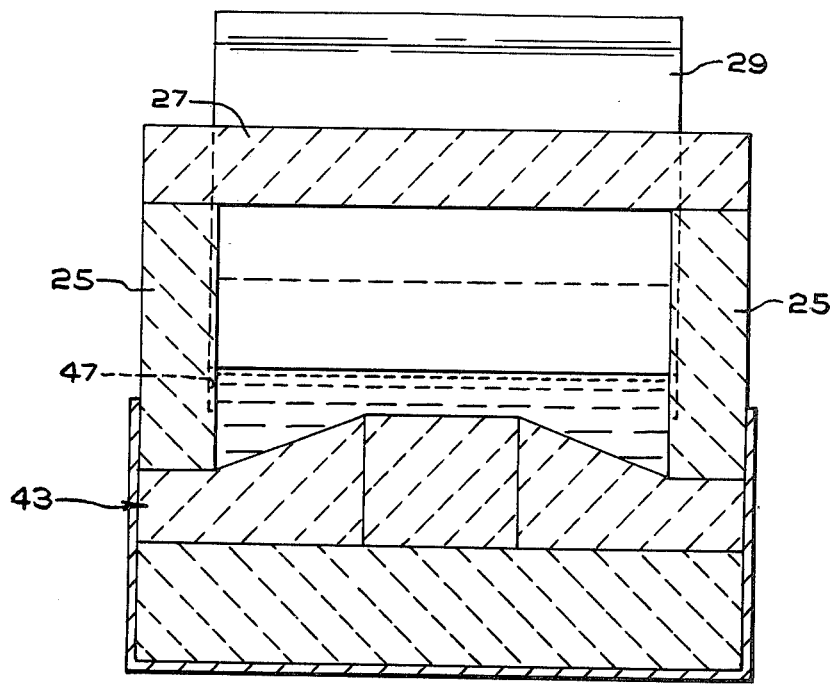

The upper convex surface of the bottom forming entrance member of the instant invention may be shaped as a continuous curve such as would be generated by rotating a straight line about one or more axes. The location of the locus of the highest points of transverse cross-sections of the forming chamber entrance bottom form a line generally extending in the direction of glass movement. Any upward facing convex shape that allows even velocity of glass moving over the channel bottom may be utilized in the invention. For example, the convex surface may be the section of a cylinder or may be parabolic or hyperbolic in shape. However, it may be convenient to provide a bottom member having an upper surface comprising a plurality of substantially flat or planar surfaces with their regions of intersection slightly rounded to blend the relatively flat surfaces into a continuous convex surface. In FIG. 4 there is illustrated a bottom member or threshold comprising a generally cylindrical raised convex portion with its center line aligned with the direction of glass movement. Illustrated in FIG. 5 is an alternative section of a bottom member 43 wherein the delivery channel, is composed of blocks that are formed with planar upper surfaces 51, 52, 53, 54 and 55 combined to form the bottom forming entrance member with an upward facing convex surface. Such a construction may be easier to fabricate than a surface which is the arc of a circle. The FIG. 6 device also is an illustration of a forming entrance bottom member having a generally convex upper surface formed from several planar surface blocks.

Figure 7:
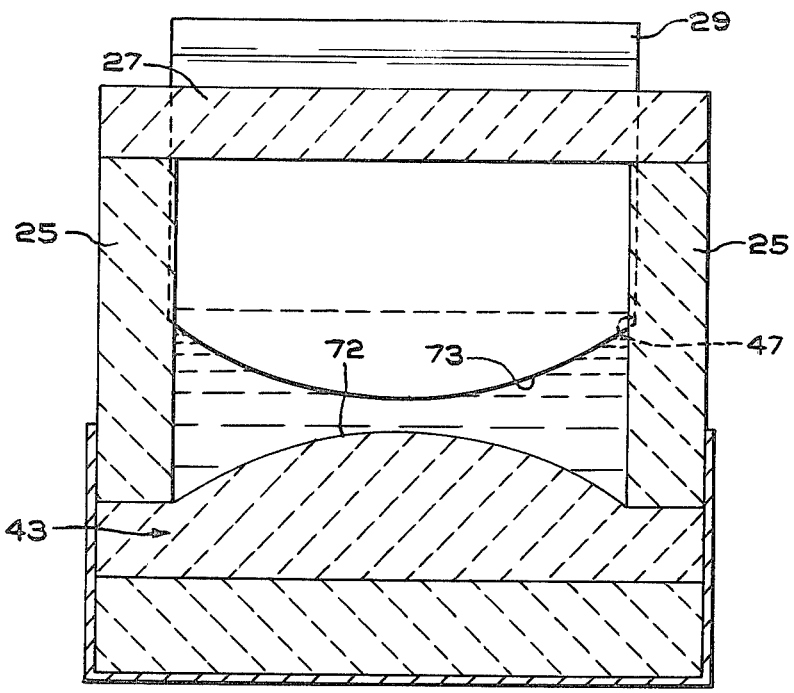

FIG. 7 illustrates an alternative embodiment of the apparatus wherein the tweel member 29 has a downward facing convex shape that opposes the upward facing convex shape of the forming entrance. Such a structure would aid in the goal of the invention which is the equalization of the temperature of the glass across the forming entrance width.

It is clear from the drawings and description that the tweels of the instant system generally will not totally prevent glass flow when closed against the upward convex bottom surface. Therefore, the back-up tweel 31 must be relied upon to stop the flow of glass in the event of repair or mechanical difficulty with tweel 29. It is within the invention to include another back-up tweel shaped in conformance with the convex shape of the bottom which could be utilized both as a back-up tweel to shut-off glass flow and as an alternate regulator of glass flow during replacement times for the main tweel 29.

Figure 8:
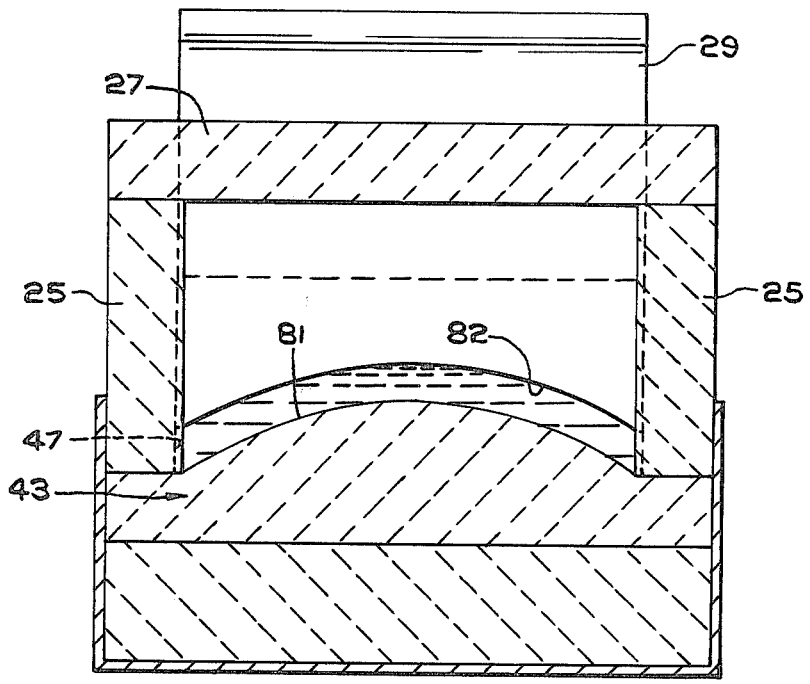

The alternative embodiment where the metering tweel will serve to shut off glass flow, if necessary, is illustrated by FIG. 8 wherein the tweel 29 has a concave aspect 82 which matches the upwardly convex surface of the bottom of the forming entrance. While this tweel will shut off glass flow it is less effective in allowing even flow of glass in the forming entrance. However, as above stated, a shaped tweel alone will not significantly alter the glass flow and therefore a tweel such as in FIG. 8 does not defeat the purpose of the invention.

Figure 9:
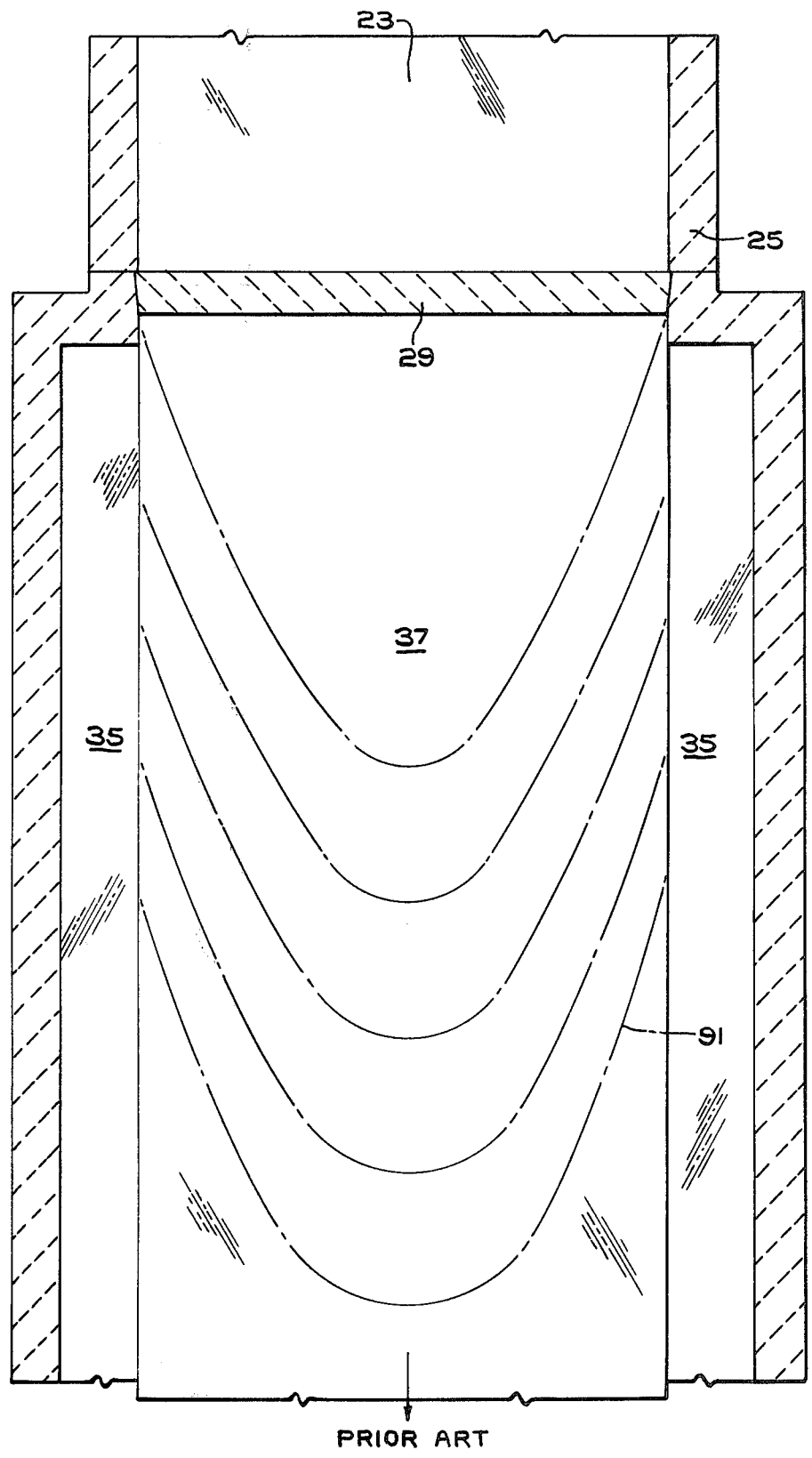
FIG. 9 is a partial plan view representing the temperature and viscosity profile in glass of the prior art.
Figure 10:
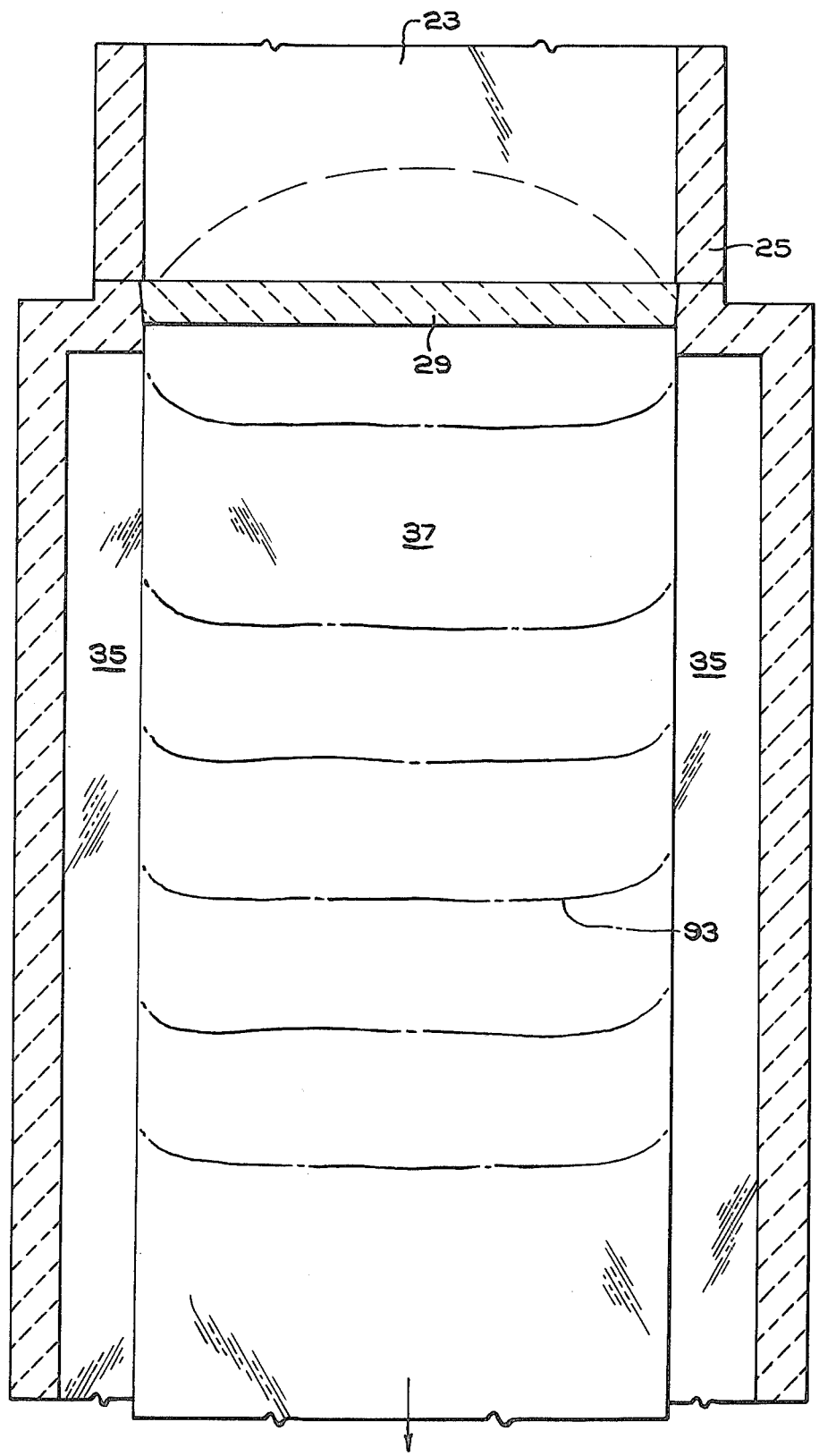
FIG. 10 is a partial plan view representing the temperature and viscosity profile of glass delivered to a forming chamber by the instant system.

Illustrated in FIGS. 9 and 10 are representations of the change in temperature and viscosity patterns of the molten glass when the instant invention is utilized.

Illustrated in FIG. 9 is the temperature and viscosity pattern of the glass exiting a prior art conventional flat bottom forming entrance. The temperature and viscosity curves as represented by the parabolic curves such as 91. The glass viscosity varies with temperature and therefore their curves may be considered as identical in this instance.

In FIG. 10 is illustrated the temperature and viscosity plots of glass delivered to a forming chamber in accordance with this invention. The temperature and viscosity profiles such as 93 are substantially transverse of the glass movement. This allows even attenuation and width regulation to achieve uniform glass thickness. While illustrated as delivering glass of substantially uniform temperature it may be desirable to sometimes design the convex bottom forming entrance so that the glass has edges that are hotter than the center. This would allow cooling to uniform temperature in the forming area where the greatest stretching of the glass takes place; thereby in some instances giving a more uniform thickness contour.

It is also within the invention to utilize external heating and or cooling with the forming entrance of the invention. Changes in the throughput or temperature of glass may require external heating of the forming entrance sides to maintain high side glass temperature and may require some overhead cooling of the center portion. Even when the external heating or cooling is required the amount needed is less than would be needed with a flat bottomed forming entrance.

The length of the forming entrance utilizing the convex upward facing bottom member of the invention may be between 7 and 25 feet for suitable glass formation. A preferred length is between about 10 and about 15 feet for good opportunity to stabilize the glass flow and relieve temperature and current effects of the melter.

The heights of the convex bottom piece for the forming entrance of he invention may be any amount of convex curvature which results in good glass formation. A preferred amount of curvature would give about twice the glass depth at the margins of the channel as at the portion of least depth between the tweel and the upward convex surface. This amount of convex shape ordinarily gives the most even temperature viscosity distribution in the glass sheet. However, depending on the width of the channel, flow rate, and viscosity of the glass being delivered for forming, this may be varied.

Although this invention has been described with reference to a particularly preferred embodiment, those skilled in the art of glassmaking will recognize that variations may be made in the practice of this invention without departing from the concepts disclosed here. For instance, while the invention is illustrated and finds its preferred use in the formation of flat glass the concept also would be suitable for use in delivery entrances for formation of bottle glass. Further, although described in relation to a float forming process wherein a wide ribbon of glass is delivered directly to the forming chamber, the invention also would improve the formation of the glass in a process in which the glass is supplied to the forming chamber in a free fall onto the molten metal bath. While this method of applying glass to the molten metal does cause mixing that relieves some of the temperature viscosity profile that is caused by passage through the channel; some of the temperature viscosity profile survives as the glass in the middle of the delivered stream tends to remain in the middle of the forming chamber as the glass spreads over the molten metal and is drawn out of the forming chamber. Therefore, delivery of glass with a controlled transverse temperature profile would also aid such free fall processes.

Accordingly, this disclosure is intended to be illustrative rather than limiting and variations may be made from the described methods and devices without departing from the substance of this invention. For instance the delivery channel could have an arched roof rather than vertical walls and a flat roof. Also, the instant invention would include a forming entrance enclosed with a bottom and arch shaped top rather than two vertical sides and a horizontal top.

I claim:

1. A forming entrance joining a glass furnace and a glass sheet forming chamber comprising side walls, an elongated bottom member therebetween extending in a horizontal direction having an upwardly facing bottom surface having high points located in a central area extending in the direction of movement of glass between said side walls from said furnace to sid forming chamber and low points in areas adjacent said side walls, the differences in height between said high and low points of said upwardly facing bottom surface being sufficient to provide a more uniform viscosity through the ribbon of molten glass delivered to the forming chamber.

2. The forming entrance of claim 1 wherein said bottom member comprises clear fused quartz.

3. The forming entrance of claim 1 further comprising a metering member transverse of said entrance extending downward toward said bottom surface.

4. The entrance of claim 1 wherein said metering member has a horizontal lower end that is spaced twice the distance from the sides of said bottom surface as from the highest point of said convex surface.

5. The entrance of claim 1 wherein said entrance is between about 5 and about 25 feet in length.

6. The entrance of claim 1 or claim 4 wherein said upwardly facing bottom surface is formed by an arrangement of planar surfaces.

7. A method for producing a more uniform viscosity across a ribbon of molten glass delivered to a sheet glass forming means by passing said glass from a furnace through a forming entrance defined by side walls and a bottom having an upper surface for supporting said molten glass comprising, decreasing the depth of said molten glass in a longitudinally extending central area of said less viscous flowing molten glass to a depth less than that of the more viscous molten glass flowing adjacent said side walls, said difference in depth being sufficient to provide a more uniform viscosity throughout the ribbon of the molten glass delivered to said forming chamber.

8. The method of claim 7 wherein the rate of delivery of said glass is controlled by a moveable top member reducing the cross-section of glass flow in said forming entrance.

9. The method of claim 7 wherein the temperature and the viscosity of said glass delivered to said forming means is substantially uniform.

10. The method of claim 7 wherein the glass stream delivered to said forming means is at least as hot at the edges as the center.

11. An apparatus for the manufacture of flat glass comprising:
   a. a glass melter:
   b. a glass conditioner connected to said glass melter;
   c. means for forming a continuous, dimensionally stable sheet of glass including a pool of molten metal upon which glass floats during forming said pool of molten metal having an upper surface; and d. means connected to said glass conditioner and to said forming means for delivering molten glass from said glass conditioner onto said pool of molten metal of said forming means, wherein said delivery means is an enclosed forming entrance having side walls and an elongated bottom member between said conditioner and said means for forming over which said molten glass may flow, wherein said bottom member has an upward facing bottom surface having high points located in a central area generally along the centerline of said forming entrance and low points adjacent said side walls and the difference in height between said central portion and said side portions being sufficient to provide a more uniform viscosity throughout the ribbon of molten glass delivered to the forming chamber.

12. The apparatus of claim 11 further comprising side members extending upwardly from both sides of said transversely extending member; and a roof member extending between said side members and extending transversely across the top of said forming entrance.

13. The apparatus of claim 12 wherein said delivery means further comprises a metering member extending transversely across said forming entrance and extending downwardly from said roof member.

14. The apparatus of claim 11 wherein said upward facing bottom surface is formed by an arrangement of planar surfaces.

15. The apparatus of claim 11 wherein said forming entrance is between about 5 feet and about 25 feet long.

16. The apparatus of claim 11 wherein said forming entrance extends between about 10 feet and about 15 feet.

17. The apparatus of claim 11 wherein said upward facing bottom surface extends along substantially the entire length of said forming entrance.

18. The apparatus of claim 13 wherein said metering member bottom surface is substantially horizontal.

19. The apparatus of claim 13 wherein the bottom surface of said metering member is convex.

20. The apparatus of claim 13 wherein the bottom of said metering member is concave.

21. A method for making flat glass comprising
a. melting glass;
b. conditioning the melted molten glass to prepare it for forming;
c. delivering molten glass over a forming entrance having side walls, an elongated bottom member extending in a horizontal direction having an upward facing bottom surface having high points located in a central area extending generally along the direction of movement of said glass between said side walls from said conditioning and onto a pool of molten metal having an upper surface maintained at an elevation substantially at or below the lower marginal portions of the upwardly facing bottom surface of the; forming entrance, the differences in height between said high points and said lower marginal portions of said upwardly facing bottom surface being sufficient to provide a more uniform viscosity throughout the ribbon of molten glass delivered to said pool of molten metal;
d. cooling the delivered molten glass on the pool of molten metal to form a continuous, dimensionally stable sheet of glass; and
e. withdrawing the continuous sheet of glass from the pool of molten metal.

22. The method according to claim 21 wherein the width of the ribbon of glass on the pool of molten metal is maintained substantially the same as the width of the stream of molten glass delivered from the forming entrance.

23. The method of claim 21 wherein said forming entrance has a length of between about 5 and about 25 feet.

24. The method according to claim 21 wherein said glass is a soda-lime-silica glass and said forming entrance is clear fused quartz.

25. The method of claim 21 wherein the depth of glass delivered to said molten metal pool is controlled by movement of a top member.

26. The method of claim 25 wherein said top member is a tweel having a substantially horizontal bottom.

27. The method of claim 25 wherein said top member is a tweel having a bottom in a downward facing convex shape.

28. The method of claim 25 wherein said top member is a tweel having a concave shape.

29. The method of claim 21 wherein said molten glass delivered into said pool of molten metal has a substantially equal temperature transverse of its direction of movement.

* * * * *